United States Patent [19]

Villa-Real

[11] Patent Number: 4,481,382

[45] Date of Patent: Nov. 6, 1984

[54] PROGRAMMABLE TELEPHONE SYSTEM

[76] Inventor: Antony-Euclid C. Villa-Real, 2512 Capistrano Ave., Las Vegas, Nev. 89121

[21] Appl. No.: 428,163

[22] Filed: Sep. 29, 1982

[51] Int. Cl.$^3$ .................... H04Q 7/04; H04M 11/00
[52] U.S. Cl. ........................... 179/2 EA; 179/2 EC; 179/2 TC; 179/2 TV; 179/90 BD; 179/6.18
[58] Field of Search ............... 179/2 E, 2 EA, 2 EB, 179/2 EC, 2 R, 2 TV, 2 TC, 2 BP, 90 B, 90 K, 90 BB, 90 BD, 90 AD, 18 BA, 602, 6.18

[56] References Cited

U.S. PATENT DOCUMENTS

| | | | |
|---|---|---|---|
| 4,119,810 | 10/1978 | Marin et al. | 179/90 B X |
| 4,220,820 | 9/1980 | Mallien | 179/2 EB |
| 4,356,519 | 10/1982 | Cogdell, Jr. | 179/2 EC X |
| 4,399,331 | 8/1983 | Brown et al. | 179/90 BD X |

*Primary Examiner*—Gene Z. Rubinson
*Assistant Examiner*—W. J. Brady
*Attorney, Agent, or Firm*—Young & Martin

[57] ABSTRACT

A cordless musical extension telephone unit with programmable capabilities, wherein a singular or a plurality of respective data block relevant to future phone calls to be made can be entered into its micro-computer's memory so that, according to the sequence of programmed time and/or data when each respective phone call becomes due, as coordinated with the forward progression of actual time and date, the integrated alarm system can effectively remind the user to make the respectively pre-programmed phone call without delay, while the relevant block of information about the current targeted call becomes automatically displayed at the LCD or LED display window. An automatic-dialing-after-alarm function key (ADA key), which upon activation, extracts from the micro-computer's memory, the block of information such as the particularly stored telephone number at hand (including the area code, if it is a long-distance call) and automatically inter-connects the extension unit through its corresponding base center to the targeted phone number, to effect the desired inter-phone connections. Upon completion of each phone conversation with the desired party, the activation of another function key enables the user to enter the information about the completed contact, together with the respective data block into the unit's memory, so that, upon the forward or backward retrieval of the variously programmed multiple phone numbers including the time, date, and names or initials of the parties involved, the user can distinguish the parties and phone numbers that have already been contacted, from those which have not yet been contacted, thus informing the user to further reprogram the uncontacted phone numbers and/or the respective names or initials for some other future times and dates as desired. An auto-beeper function key provides automatic conversion of the device into a regular beeper, once the unit gets out-of-range as an extension phone. In the stepped-up model, the unit is incorporated with several other features for excellent compact multi-use.

12 Claims, 8 Drawing Figures

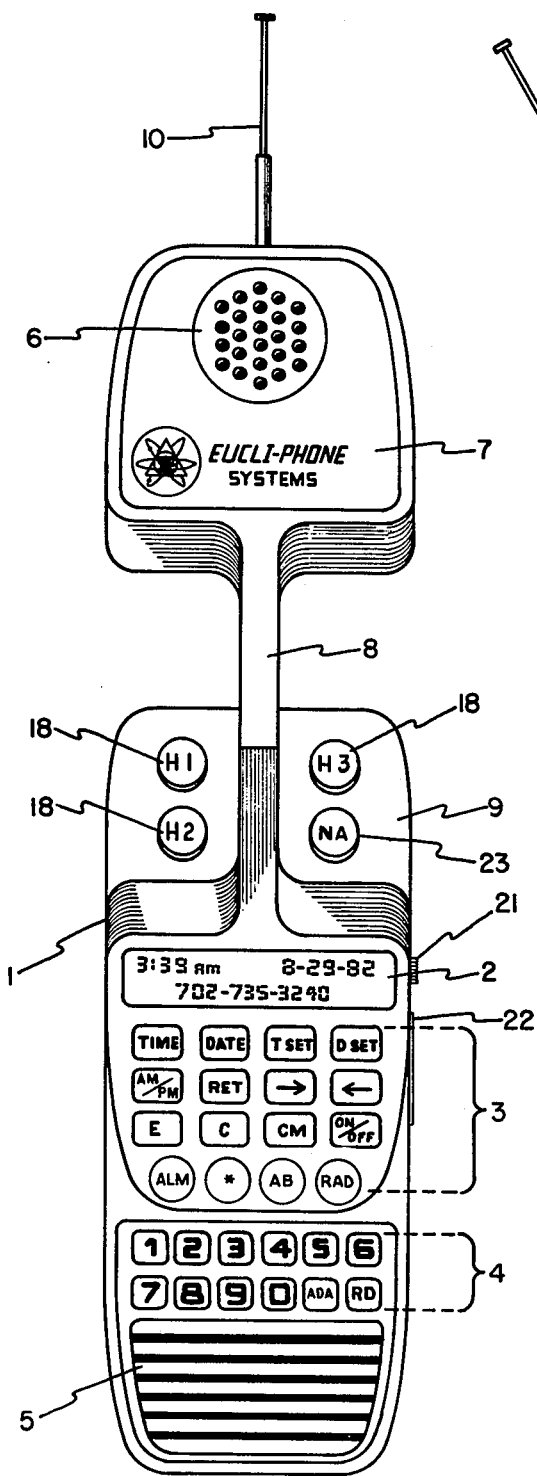
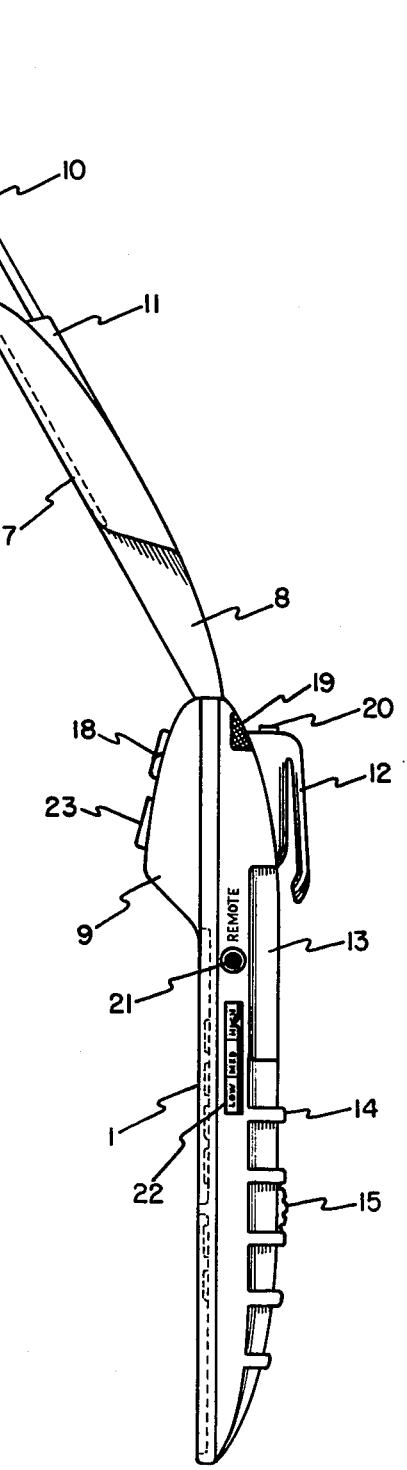
FIG. 1
FIG. 2

PROGRAMMABLE TELEPHONE SYSTEM

BACKGROUND OF THE INVENTION

The present invention relates generally to communication equipment, and more particularly, to a cordless musical extension telephone unit having programmable capabilities and other interesting and useful innovative features.

Although there are now several competing cordless extension phones in the market, none of these are equipped with a combination of musical, recording and playback features with input and output functions, memory entry, storage and reviewer that coordinate with an audio-visual reminder system, wherein a singularity or plurality of future phone calls, including the specific times and dates and respective telephone numbers and/or the individual names or initials of the targeted party to be phoned in sequential order, can be programmed into the unit's micro-computer's memory in advance, so that, with the progression of actual time and date that are constantly compared to the electronic timer and calendar and alarm system, the device becomes a very valuable tool for the professionals as well as for the general public on a worldwide scale, in systematically pre-arranging and scheduling the multitude of important phone calls, without running the risk of forgetting.

In our busy world of activities, the programming of future phone calls to be made is of great essentially in achieving better success in our personal and business affairs. A great many people forget to make important personal and business calls such as greeting friends or loved ones during anniversaries, birthdays and holidays, and calling business associates or other business entities or contacts for appointments or other business matters because of all kinds of reasons, thus resulting in countless embarrassment and loss of opportunities that are really hard to gauge.

Furthermore, ordinary extension phones available today have no second or third use. Because of the need of millions of people to have a compact, carry-along device with multiple uses, I have incorporated several accessory features in my invention, so that, as a combination, it will serve a wider range of service to the user at a totally economical price, thereby increasing a far greater public demand.

BRIEF SUMMARY OF THE INVENTION

1. One object of the present invention is to provide a cordless programmable musical telephone extension unit with alpha-numerically programmable capabilities, enabling the user to enter into the unit's micro-computer's memory a singular or multiplicity of telephone numbers, including the respective initials or name of each person to be phoned by the user, at certain designated future times and dates, and, in coordination with an electronically activatable automatic audible alarm and digital display system, the user can be reminded when to make each of the designated phone calls to the right party as soon as each of the previously programmed call becomes due, relative to the actual time and date.

2. Another object of the present invention is to provide a cordless programmable musical extension phone unit with an electronically activatable function key, which when activated, can instantly inter-connect the extension phone unit of the caller to the designated targeted telephone number without manually repeating the activation of each individual digits of the pre-programmed telephone number, and in case the telephone line of the other party is engaged, the system, through the use of an automatic redial key, can continuously scan this busy signal, so that once the said phone line becomes free, the desired inter-phone connection can rapidly become activated automatically.

3. A further object of the instant invention is to provide a cordless programmable musical extension phone unit which can automatically be activated to function as a beeper from the moment the device is carried by the user away from its effective range as an extension phone.

4. And yet a further object of the instant invention is to provide a cordless programmable musical extension phone unit capable of receiving multiple call signals.

5. Still a further object of the present invention is to provide a cordless programmable musical extension phone unit capable of recording telephone conversations between the calling parties by the use of a micro-cassette recorder for future playback references, and, in conjunction with this function, a synthesized intelligible voice is automatically announced informing the parties that the phone conversation is being recorded, thus avoiding any phone conversation recording without the knowledge of both parties.

6. And another further object of the present invention is to provide a cordless programmable musical extension phone unit wherein the integrated micro-cassette tape recorder and player can be utilized by the user for recording and playback purposes independent of the function of the phone unit.

7. And still a further object of the present invention is to provide a cordless programmable musical extension phone unit wherein a "No-Alarm" function key is integrated with the system, which, when in the activated position will prevent the triggering of any future alarm signals and visual displays pertaining to the preprogrammed future phone calls, until such time when the said function key is again deactivated, without affecting the ringing of the phone for incoming calls.

9. A further object of the present invention is to provide a cordless programmable musical extension telephone unit which can be programmed to automatically awaken or remind the party of the pre-programmed targeted telephone number about something, at a certain designated time or date, even though the caller is still asleep or busy with other activities.

Other objects and advantages of the present invention will become apparent based on the detailed descriptions and illustrative drawings and claims.

BRIEF DESCRIPTION OF THE ILLUSTRATIVE DRAWINGS

FIG. 1 is the front elevational view of the flipped-open position of a simple embodiment of the present invention.

FIG. 2 is a left side elevational view of the device of FIG. 1.

DETAILED DESCRIPTION OF THE ILLUSTRATIVE DRAWINGS

Figure 3:
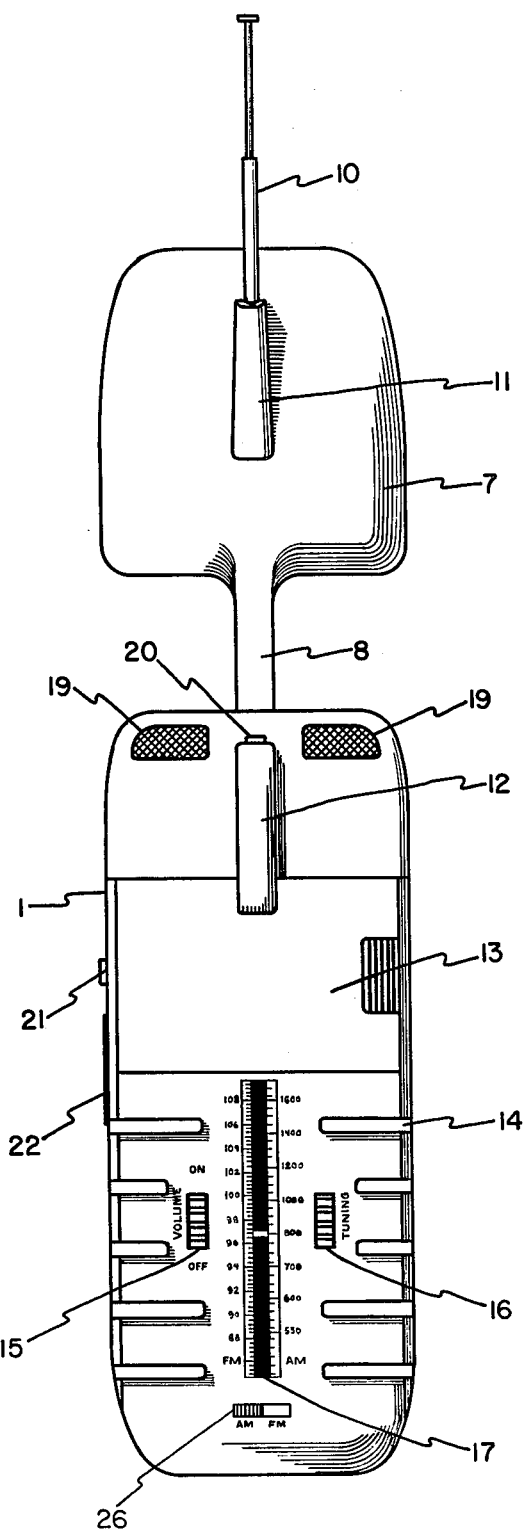
FIG. 3 is the back elevational view of the flipped-open position of the embodiment of the device of FIG. 1.

Referring now to the drawings wherein like numerals and like numeral-letter combinations refer to like parts, there is shown at FIGS. 1, 2, and 3, a simple embodiment of the present invention comprising of a lower main housing 1, an upper housing 7, and a structural inter-linking stem 8 than links the lower main housing to the upper housing in a flip-flop fashion. Antenna 10 is shown in the extended position during telephone conversations. In FIG. 1, there are shown the upper housing which contains the phone receiver 6, the lower main housing containing the phone speaker unit 5, and the display window 2, which shows the time, date, and complete telephone number of the targeted party. At the face of the upper convex elevated portion 9 of the lower main housing 1, there are shown the three separate incoming call keys 18 marked H1, H2, and H3, respectively, including the "NA" (No-Alarm) key 23, which when activated, will prevent the ringing or beeping of the alarm, but will not inhibit the ringing of the phone for incoming calls. Each of the three hold keys, when activated, will put the respective incoming call of the current party on hold. The extension phone unit has an integrated AM/FM radio 17, with an On/Off and volume control knob 15, and a tuning knob 16, and an AM/FM selector switch 26, all shown in FIG. 3.

In FIGS. 1, 2, and 3, the numeral 22 represents the battery level indicator, and graded as "Low", "Medium", or "High" in FIG. 2.

In FIG. 1, there are shown, in group 3, a set of 15 function keys marked as: "Time" key, which when pressed, all automatically display the actual time at the LED or LCD display window 2; "Date" key, which when pressed, will display the actual date; "T-Set" key, which when activated, will enable the user to set and display the correct time by the use of the combination of numbers in group 4; "D-Set" (Date Set) key, which when activated, will enable the user to set and display the correct date by the use of the combination of numbers, also in group 4; "AM/PM" key which, when not depressed, will register AM with the set time at the display window, and which, when depressed, will register PM with the set time at the display window; "RET" (Retrieve) key which, when activated in combination with the activated "→" (Forward) key or the activated "←" (Rearward) key, will respectively display the pre-programmed stored telephone numbers, including the corresponding times and dates, in a sequentially forward or rearward fashion, respectively, at certain pre-programmed intervals; "E" (Enter) key which, when activated, enters into the micro-computer's memory each set of relevant future time and date and telephone number of the targeted party; "C" (Clear) key which, when activated, will erase from the display window whatever error or undesired data that are displayed before entry into the unit's memory; "CM" (Cancel form Memory) key which, when activated, will cancel from the unit's memory the set of data that is currently displayed at the LED or LCD display window; "ON/OFF" key, which when depressed, will activate all relevant telephone and programming functions, and which, when not depressed, will deactivate the outgoing phone function as well as the relevant input programming functions, but without affecting the internal memory of the system, and without affecting the incoming call signals; "ALM" (Alarm) key, which when in the depressed activated state, will trigger a different kind or tone of alarm (distinguishable from the beeping or ringing sound as when there is an incoming call) at the exact time and date when the current sequence of pre-programmed telephone number of the respective targeted party has commenced, relative to the actual time and date; an "*" (Asterisk) key, which when activated will imprint the asterisk "*" marking on the display window, together with the block of information, such as the time and date, and the telephone number of the other party that has just been successfully contacted, and the said asterisk "*" marking will automatically be entered into the micro-computer's memory, together with the respective block of information currently on display, in order that, upon future forward or rearward retrieval of the variously programmed plurality of times and dates and phone numbers respective to the parties involved, the user can distinguish the phone numbers that have already been successfully contacted, from those which have not yet been contacted, thus informing the user which uncontacted telephone numbers need to be re-programmed for another sequence of future telephone contacting, aided by the unit's alarm system, at some future times and dates, respectively, as desired; an "AB" (Auto-Beeper) key which, when activated, will automatically warn the user, through some kind of audio-signal tones that the unit is crossing away from the effective range of the extension phone function, and automatically, the unit becomes converted into a regular beeper which can now receive incoming messages from an outside calling party through the utilization of another radio frequency wavelength; an "RAD" (Radio Mode) key, which when activated will put the phone system to integrate with the radio function.

The group 4 function keys in FIG. 1 include numerals 1 through 9 and 0 (Zero), which can be used in case of making direct outgoing phone calls, as well as in the programming and reprogramming of all future telephone calls as coordinated with the alarm activation sequencing of the various future times and dates respective to the telephone numbers to be contacted. Once the alarm is heard, and the user (seeing the automatically displayed actual time and date and pre-programmed telephone number of the party to be phoned) desires to instantly make the currently scheduled phone call, he simply activates the "ADA" (Automatic-Dialing-After Alarm) key (also included in group 4 of FIG. 1) and, the current telephone number on display will immediately be extracted from the unit's memory and becomes instantly utilized to automatically inter-connect the extension unit to the targeted phone number of the other party, through the main base center of the system. A second use for the "ADA" key is in a situation, wherein the user decides not to talk to the next upcoming scheduled pre-programmed party at the targeted phone, and merely wants to remind or awaken the other party about some commitments at a certain time or date. In this case, the "ADA" key should already be set in the activated position in coordination with the "ALM" (Alarm) key, so that when the alarm signal commences, the "ADA" function will immediately take over in extracting from the micro-computer's memory the telephone number of the scheduled targeted party, and will automatically ring the said telephone number. For further assurance that the targeted telephone number will ring, in case the targeted telephone is busy because another person in the same household of the targeted party may be using the targeted phone, while the said targeted party is asleep or busy, then, it is important to also set the "RD" (Redial) key in the activated position, so as to automatically activate the ringing of the targeted phone once the busy signal disappears. If the user decides that, instead of the continuation of the series of ringing of the targeted phone, he wishes to convey a tuned in selected AM or FM radio program to the other party of the targeted phone, he must activate the "RAD" key to integrate the future phone link with the radio, and, through the internal electronic function of the extension phone, the ROM part of the unit's microcomputer which may have been set in such a way that, after several rings of the other party's phone, the ringing will stop even before the telephone receiver of the targeted phone is lifted, and then instantly, the tuned in radio program at that set time and date will take over for the other party to listen to through the other party's phone speaker (if a similar device is used) so that the caller may be personally identified by the other party in a musical or non-musical coded sort of way to remind him or her about some pre-arranged situation or commitment or schedule to be met. This feature is interestingly innovative and very useful especially when the inter-phone message reminding involves a plurality of individuals in one's public or private affairs, to avoid the guessing game of who may be calling and for whom the call is being aimed. This will add excellent sophistication and subtlety to the advantages of the device. In this case, the radio 17 at the back part of the device shown in FIG. 3, should also be in the "ON" position with the proper AM or FM tuning and volume already set by knobs 15 and 16, respectively, with the proper placement of AM/FM selector switch 26 and with the "RAD" (Radio) mode key in FIG. 1 also activated. When the coordinated already-activated keys for the "ADA", "RD", "ALM", and "RAD" are inter-linked with the activated radio, the set AM or FM radio program will be piped in to the other party's phone receiver at the right pre-set actual time and date of the currently commencing targeted phone number being interlinked.

In FIGS. 2 and 3, numeral 21 represents an electrical socket for linking the device to other accessories; one example being for its use with a mini-earphone for silent radio listening. Structural gripping edges 14 used for the better handling of the device are also shown. An electrical socket 20 is also shown to allow for the proper electrical recharging of the batteries and for use during the operation of the device using the AC source.

All audio alarm or incoming call signals are heard at speaker 19 shown in FIG. 3. In FIGS. 2 and 3 the clip-on structure 12 is shown for easy clipping hold to the shirt or coat pocket. In FIG. 3, numeral 13 represents the storage area reserved for the batteries, and 11 represents the antenna housing and connector.

Figure 4:
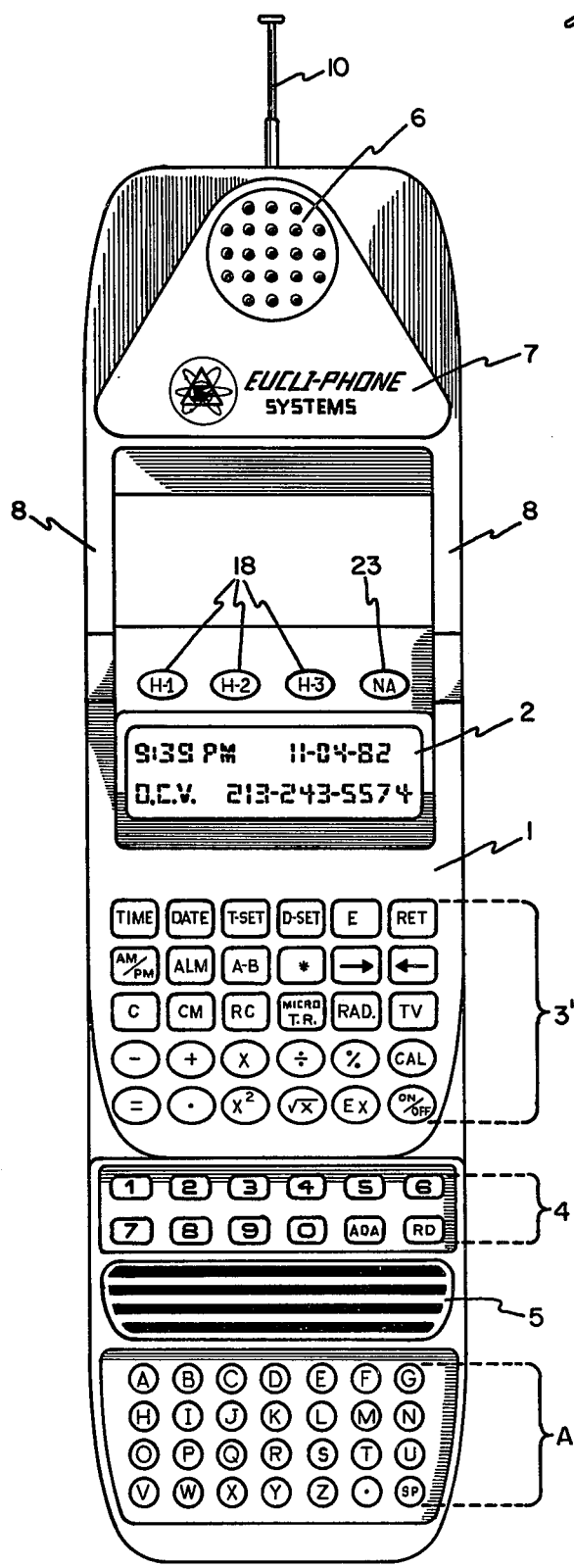
FIG. 4 is the front elevational view of the flipped-open position of a more advanced embodiment of the present invention.
Figure 5:
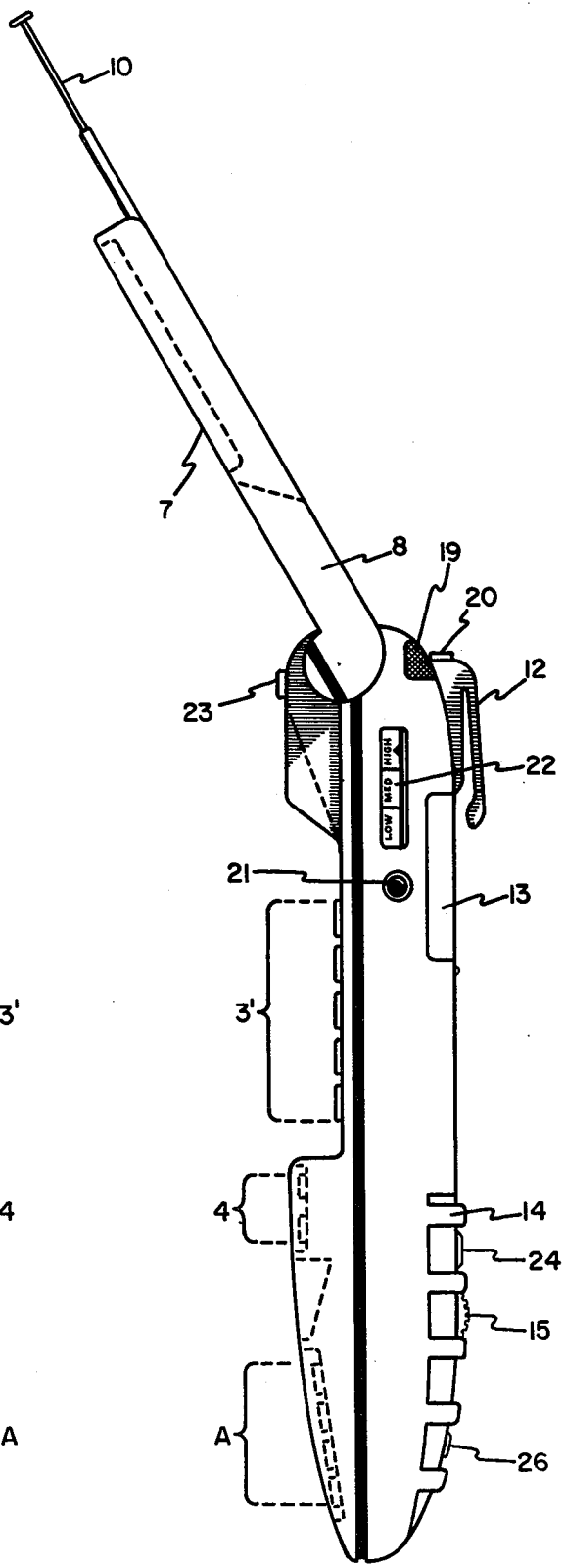
FIG. 5 is the left side elevational view of the device of FIG. 4.
Figure 6:
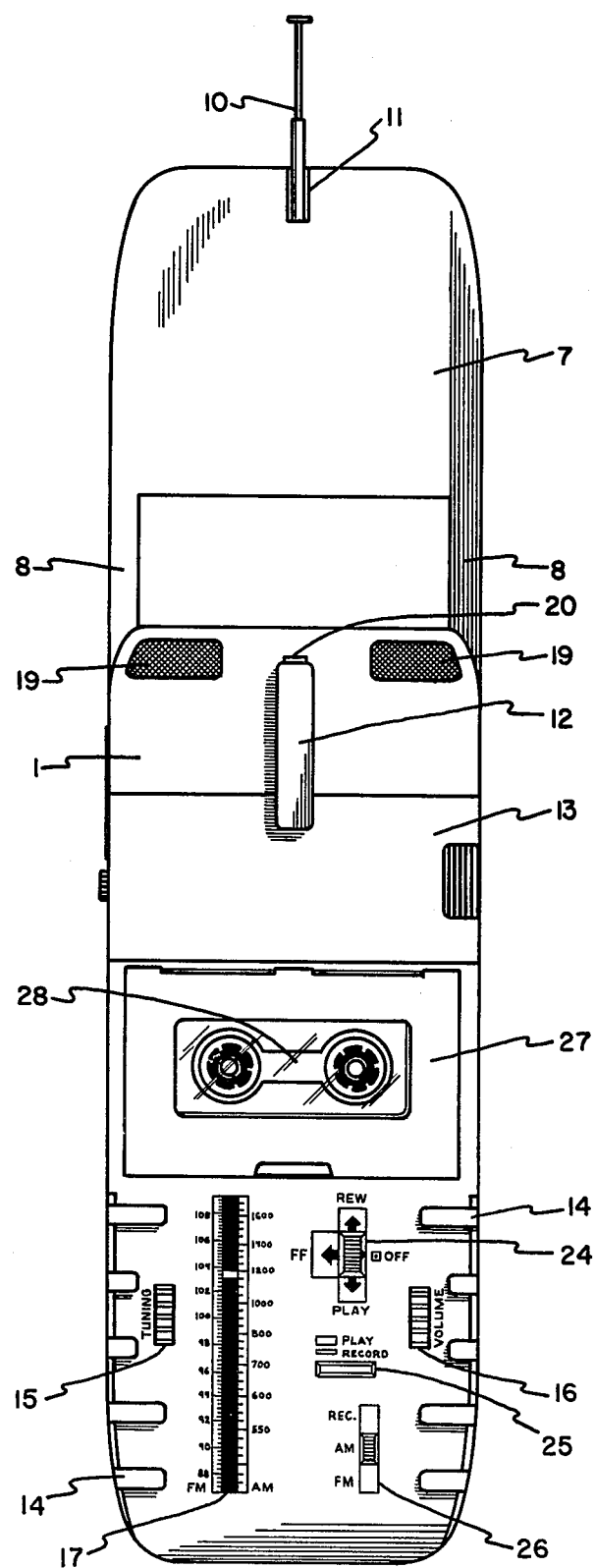
FIG. 6 is the back elevational view of the flipped-open portion of the more advanced embodiment of the device of FIG. 4.

In FIGS. 4, 5, and 6, which is the more advanced model of the present invention, all the other structures and functions of the simple embodiment of FIGS. 1, 2, and 3 are included, except that this advanced model contains additional structures, features, and functions such as; (1) the entry and retrieval of the initials of the targeted party together with the respective telephone number, and the specific time and date shown at the display window; (2) the alphabet keys from A to Z, including the key with a symbol for "." (Period), and, a key with a symbol of "SP" for (Space), all included in group A, shown more clearly in FIG. 4; (3) Additional keys included in group 3' marked "RC" for recording telephone conversation, "Micro-T.R." for the micro-cassette tape recorder/player mode, "TV" for television mode; "CAL" for calculator mode, and including the mathematical calculation keys marked "−", "+", "X", "÷", "%", "=", ".", "×2", "√x", "Ex". In this particular embodiment, there is a double inter-linking structural stem 8 connecting the main lower housing 1 to the upper housing 7, also shown in a flip-flop fashion. In FIG. 6, numeral 27 represents the area at the back of the unit that accommodates the micro-cassette tape 28; and numerals 24 and 25 represent the mechanical controls for the rewind, fast forward, play, off, recording, and playback operations of this advanced model.

DETAILED DESCRIPTION OF THE ELECTRONICS BLOCK DIAGRAM

Figure 7:
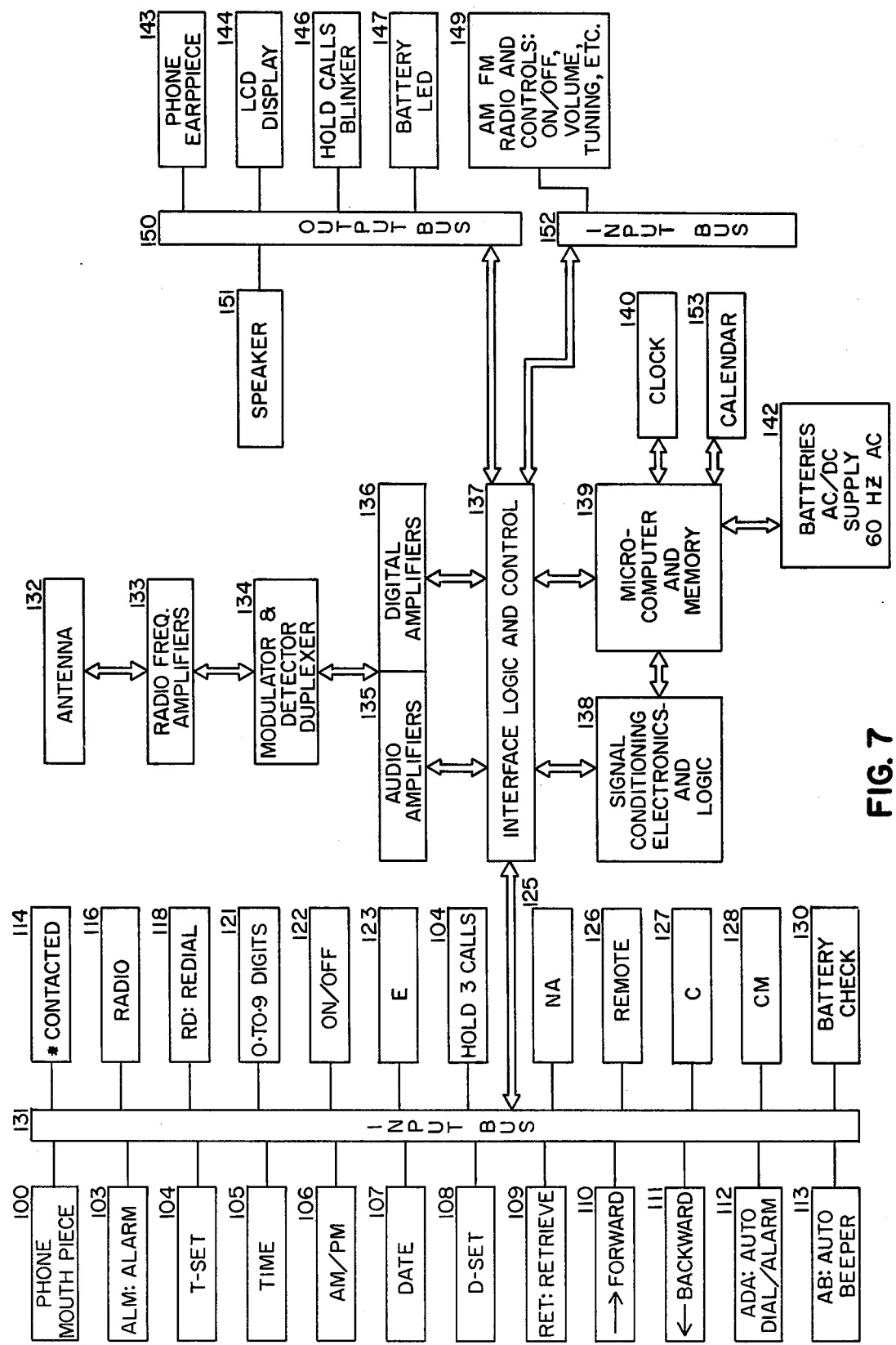
FIG. 7 is the schematic electronic block diagram of the device of FIGS. 1, 2, and 3.
Figure 8:
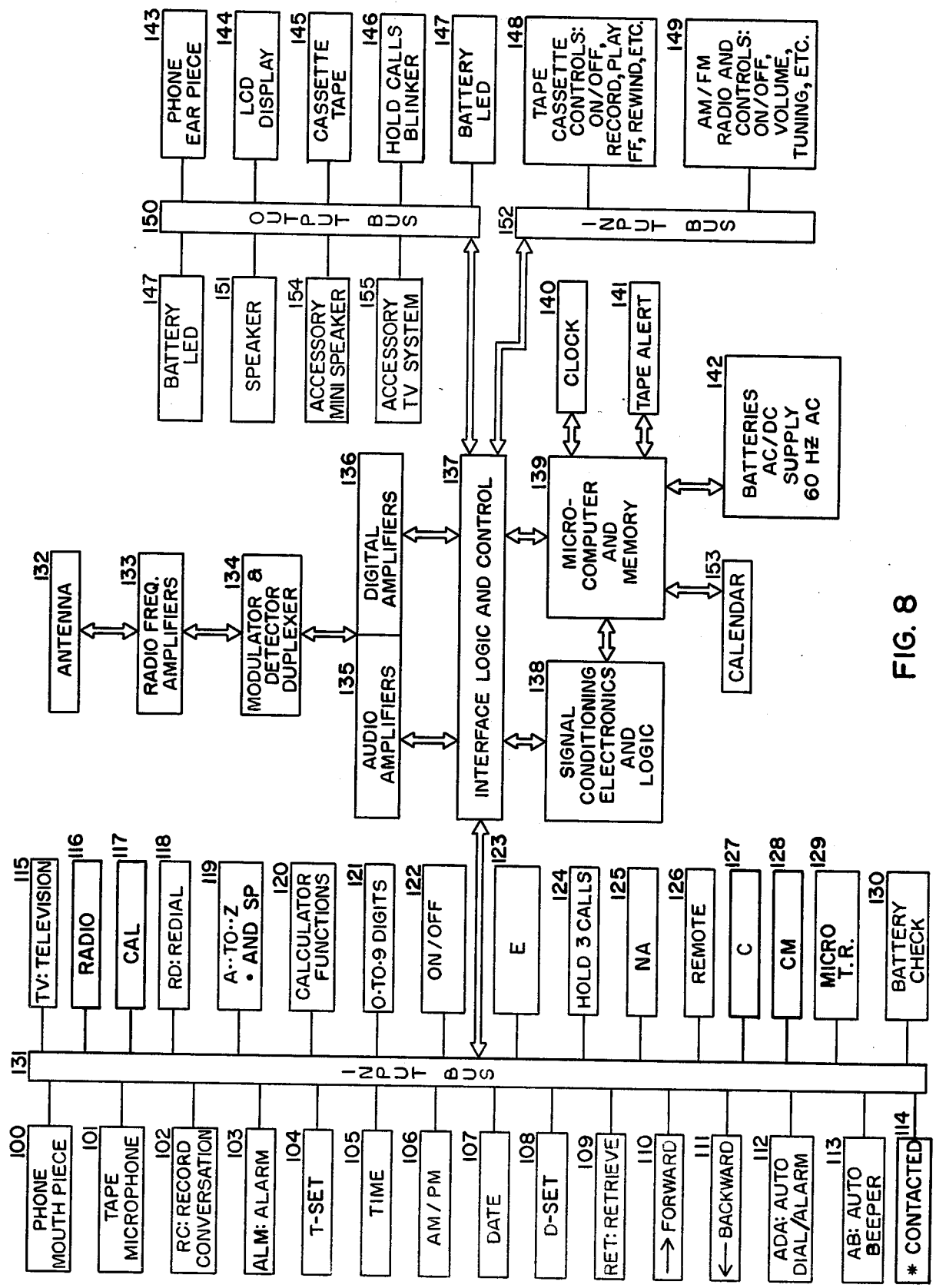
FIG. 8 is the schematic electronic block diagram of the device of FIGS. 4, 5, and 6.

In FIGS. 7 and 8, antenna 132 is tuned to the telephone carrier frequency from the base message center transmitter and receiver.

An incoming signal is picked up by the antenna, fed into the radio frequency amplifiers (RF Amps) 133, where signal gain and selection is performed. The output of the RF Amps is detected through the modulator and detector duplexer 134, and fed to either audio amplifiers 135 or digital amplifiers 136 for processing.

The signal information is filtered and conditioned for the appropriate output, such as voice, digital telephone numbers, etc., through the Interface Logic and Control 137 to the signal conditioning electronics and logic 138.

The duplexer 134 allows for transmission modes or receiving modes. Signals received by the antenna 132 are fed into the detector 134 to remove the RF carrier, then through either the audio amplifiers 135 or digital amplifiers 136, and then, through the interface logic and control 137 to the signal conditioning electronics and logic 138 to the micro-computer 139 to the output bus 150, to be heard as an audible signal at the phone ear piece 143. Signals transmitted are fed into the modulator 134 to be impressed on an RF carrier.

For a message to be sent, the output of the telephone mouth piece 100 is fed via the input bus 131 to the interface logic and control 137. There it is sent to the signal conditioning electronics and logic 138 and directed to the audio amplifiers 135, to the modulator 134 and to the RF amplifiers 133, and finally to the antenna for transmission to the base message center for regular transmission to the other party.

The entire operation is under control of the micro-computer and memory 139.

The tape alert 141 in FIG. 8 contains a voice synthesizer that transmits a warning when the telephone call is being recorded.

A 24 hour clock 140 is also under control of the micro-computer and memory 139.

The electronic calendar 152 is likewise under the control of the micro-computer and memory 139.

The ON/OFF switch must be pressed in the "ON" activated state so that all relevant input programming into the extension phone, and outgoing signals to the central base unit aimed to the targeted phone will be operational. To set the correct time:

(1) Turn on the ON/OFF key in the activated position.

(2) Activate the "T-Set" key, then set the AM/PM key. If the Am/Pm key is undepressed, it is programmed to enter AM automatically, but if depressed, will program PM.

(3) Activate the correct hour, minutes, and seconds by activating the right sequence of numerical combination of keys 0-9, for example, (a) if the correct time to be set is AM 9:32 and 43 seconds, do not depress the AM/PM key, just program 09 followed by 32 then followed by 43. (b) if the correct time to be set is PM 11:09 and 3 seconds, depress the AM/PM key, then program 11 followed by 09 then followed by 03.

(4) After checking all correct data at the LCD display window, press "E" key to impress the set of information into memory. All these information will be coming from block 104, block 106, block 121, block 122, and block 123 going via the Input Bus 131 to the ILC 137 to SCEL 138 and to the micro-computer 139 (involving block 140), back to the SCEL 138 to the ILC 137 to the Output Bus 150 to be displayed at block 144 for the visual activation of the correct time at the LCD display window. Then the micro-computer will instantly take over and keep on forwardly with the progression of correct actual time from then on, so that, upon the activation of the time key, block 105 sends information via the input bus to the ILC block 137 to the SCEL to the micro-computer block 139 (involving block 140), back to the SCEL 138 to ILC 137 to the output bus 150, and then displays the currently correct actual time at the LCD display block 144. To set the date:

(1) Be sure that the system is in the activated "ON" position.

(2) Activate the "D-Set" (Date Set) key and block 107 will relay the information via the input bus 131 to the ILC 137 to the SCEL 138 to the micro-computer 139 and calendar block 152, which contains the ROM pre-programming of the progression of the mathematical date factors up to the year 2000 and beyond.

(3) Then activate the proper combination of the numerical keys 0-9.

(4) After checking all correct data at the LCD display window, press "E" key to impress the set of data information into memory. Block 107 will send the information via the input bus 131 and the Interface Logic and Control 137, to SCEL 138 to the micro-computer 139 and calendar 153, so that upon future activation of "D" (Date) key, the proper date in progression will be automatically displayed at the LCD display window 144 via 131, 137, 138, 139, then via the SCEL 138, ILC 137 and output bus 150.

To clear the data at the LCD display window in case of error, press the "C" (Clear) key to activate block 127, and the information is sent via the appropriate channels, logic and controls and signal conditioning electronics to the micro-computer 139 to deactivate block 144 via the proper channels, logic and controls and signal conditioning electronics.

To cancel any data on display at the LCD display window from memory, press the "CM" (Cancel Memory) key to activate block 128 via the proper channels, logic and controls and signal conditioning electronics to cancel that particular data from the micro-computer and memory 139 and at the same time the data display at block 144 is cleared via the appropriate channels, logic and controls and signal conditioning electronics. Therefore, any pre-programmed telephone number with the specific time and date and name or initials of the targeted party that currently appear at the LCD display window can be canceled from memory in this manner, and the micro-computer will not any more trigger the alarm system relative to this canceled data, nor display the relevant cancelled data, because of the data's removal from the micro-computer's memory. In the event that reprogramming of the same party and telephone number is desired for some other future time and date, the procedure to be carried out is the same as the previously described initial programming for the alarm coordination for any future calls. Any programmed future call date that appear at the LCD display can be entered into memory by pressing the "E" (Enter) key, which activates block 123, and the information is sent to the micro-computer and memory 139 via the proper channels, logic and controls and signal conditioning electronics.

With the preferred embodiments of the device of FIGS. 1 (simple model) and 4 (advanced model), the following steps are to be undertaken in order to program a singular or each of the plurality of future phone calls, in a sequential or nonsequential order, according to the respectively desired time and date when each individual call has to be made:

(1) Be sure that the extension phone unit is in the "ON" activation position.

(2) activate the "ALM" (Alarm) key;

(3) then, activate the "T-Set" (Time Set) key, followed by the activation of the proper numerical key combination, to set the time;

(4) then, properly activate the "AM/PM" key to delineate the time of the day, whether AM or PM;

(5) then, activate the "D-Set" (Date Set) key, followed by the activation of the proper numerical keys from 0 to 9;

(6) then, impress the complete telephone number (with area code if long distance) by the proper numerical keys from 0 to 9;

(7) activate the right combination of letters for the respective name or initials of the targeted party (only applicable to the advanced model with the alphabet function keys);

(8) afterwards, when all of the correct block of information desired for making the future phone interlink have been checked off the LCD display window, then, finally;

(9) activate the "E" (Enter) key, to impress all of the information into the micro-computer's memory 139 via the input bus 131, the ILC (interface logic and control) 137 and the SCEL (signal conditioning electronics and logic) 138.

This relevant group of data coordinates constantly with the actual progression of time in block 140, and with the actual progression of date in block 153. All the information from block 103, block 104, block 106, block 108, block 119 (only in the advanced model), block 121, block 122, and block 123, are relayed via the input bus 131, the ILC 137, and the SCEL 138 to the micro-computer and memory block 139, in coordination with block 140 and block 141. All other future telephone calls are programmed in this manner, according to the desired specific time of the day and the desired specific date.

Once each pre-programmed time and date of any future call to be made coincides with the progression of the actual time and actual date, the device, when set in the alarm position, will trigger the alarm signal through the speaker in block 151 via the SCEL 138, ILC 137, and via the output bus 150; and, the actual time and date including the telephone number will be automatically displayed in the LCD display block 144 via the SCEL 138, ILC 137, and the output bus 150. This operation is triggered automatically by the micro-computer 139 in coordination with blocks 140 and 152.

Activating the "ADA" (Automatic-Dialing-After Alarm) key, will relay the command from block 112 via the input bus 131 to the ILC 137 to the SCEL 138 to the micro-computer 139, where the telephone number of the current targeted party will be extracted from memory, and, then inter-linked automatically back to the SCEL 138 to the ILC 137 to either the audio amplifiers 135 or digital amplifiers 136 to the modulator 134 to the RF amplifiers 133 and finally to the antenna 132 to be sent via the central base unit of the extension phone to inter-connect instantly to the targeted phone number. The incoming phone signals from the other party are picked up from the transmission of the control base unit to the extension phone unit by the antenna 132 to the RF amps 133 to the modulator and detector duplexer 134 to either the audio or digital amps 135 or 136, for processing. The signal information is filtered and conditioned through ILC 137 and SCEL 138 to the micro-computer 139, then back to the SCEL 138 to the ILC 137 and through the output bus 150, and, finally to be heard as a voice output at phone earpiece block 143.

In case the inter-connected targeted phone is busy, the activation of the "RD" (Redial) key will send the command from block 118 through the input bus 131 to the ILC 137, to the SCEL 138 to the micro-computer 139 where the information for the constant scanning of the busy signal is being initiated, and, once the busy signal disappears, the micro-computer sends the command to the SCEL 138, to ILC 137 to either audio amplifiers 135 or digital amplifiers 136 to the modulator and detector duplexer 134 to the RF amplifiers 133 to the antenna 132 for instant telephone inter-linkage, via the unit's central base to the targeted phone thus immediately effecting inter-phone contact.

During instances wherein, the user simply desires to remind or awaken the targeted party at the specifically set pre-programmed time and date, without himself engaging in a telephone conversation, it is necessary for him to leave the "ON/OFF" key in the "ON" activated position, and the "ALM" (Alarm) key, the "ADA" (Automatic-Dialing-After Alarm) key, and the "RD" (Redial) key also in the activated position, so that upon the moment of arrival of the actual time and date coinciding with the said pre-programmed time and date, the caller can effect the inter-phone link, without even lifting a finger. The other party will then receive the series of telephone ringing until he lifts up the receiver of his phone. In this case, input information from blocks 103, 112, 118, and 122 are sent via input bus 131, to the ILC 137, to the SCEL 138, and then to the micro-computer and memory 139 which constantly compares the pre-programmed data with the clock in block 140 and the calendar 152, so that at the moment of data congruence between the respective static pre-programmed time and date data with the dynamic actual time and date data in blocks 140 and 152, respectively, the desired inter-phone link is initiated instantly via the appropriate channels and sub-systems. However, if the caller, desires to awaken or remind the targeted party with piped in music from the already pre-set AM or FM radio program at a specific time and date, or with a special message that has been pre-recorded in the caller's micro-cassette tape recorder/player, without himself involving in a telephone conversation, it is essential for the caller to leave the "ALM" key, "ADA" key, "RD" key, "RAD" (Radio) mode key or the "Micro T-R" (Micro-Tape Recorder) mode key in the activated position, so that when the specific set of pre-programmed time and date relevant to the particular targeted party coincides with the actual time and date, the caller's phone will automatically be sending the desired pre-set AM or FM radio program or the contents of the caller's pre-recorded taped message to the targeted party, once the telephone inter-link has been established, even though the caller may still be asleep or busy with some other chores. In this particular case, as illustrated at FIG. 8, the input information from block 103, block 112, block 116 or block 129, block 118, and block 122, including block 149 or block 148, compositely reaching the micro-computer and memory 139 (in correlation with block 140 and block 153), via the input bus 131 and 152, the ILC 137 and the SCEL 139, are all coordinated and processed at the micro-computer and memory 139, so that the selected AM or FM radio program or the desired taped message can be sent to the phone of the targeted party via the SCEL 138, ILC 137 to either the audio-amplifiers 135 or digital amplifiers 136 to the modulator and detector duplexer 134 to the RF amplifiers 133 to the antenna 132 through the central base unit of the caller's extension phone to the targeted phone of the other party. In case the desired information to be piped-in to the pre-programmed other party is the pre-recorded tape message, the tape player control should already be manually set in the play position in advance, and activation of the actual playback of the tape will only be initiated at the exact actual time and date when the pre-programmed time and date of the inter-phone link to the other party has commenced. Automatic deactivation of the micro-cassette playback or radio piping can also be pre-programmed for a certain time-frame from the onset of the cassette playback or radio piping-in if so desired by activating the function key 25 in the play position followed by pressing the "Time Set" key then followed by the proper numerical combination of 0 through 9 at which time the caller desires to end the message after the set time of the pre-programmed phone-inter-link. This phase of operation is in addition to the regular prodecural steps of pre-programming for future calls to be made and should be entered together with the other relevant data.

In order to see the last pre-programmed future call to be made to a certain party at a targeted phone according to the desired time and date, simply activate the "RET" (Retrieve) key, and the information will be sent from block 109 via the proper channels logic and controls and signal conditioning, through the micro-computer 139 to the output bus 150 to be displayed at block 144. If the rearward or backward "←" key is also activated, the information will be sent via the input bus 131 to the ILC 137 to the SCEL 138 to the micro-computer and memory 139, which will command the rearward display of the relevant pre-programmed data at block 144 in sequentially rearward manner, according to the pre-programmed interval for automatic operation, or as long as the rearward key is still in the activated position.

However, if the user would like to reverse the data display in a forward manner, he simply activates the forward "→" key and the informaton will be sent via the input bus 131 to the ILC 137 to the SCEL 138 to the micro-computer and memory 139, where the command for the forward sequential display of the relevant pre-programmed data will be shown at the LCD display block 144 via the SCEL 138 to the ILC 137 and the output bus 150.

For the automatic activation of the device for instant conversion into a regular beeper function once the unit is carried away from the effective inter-phone range, activating the "AB" key will send the proper signal via the input bus 131 to the ILC 137 to the SCEL 138 and into the micro-computer and memory 139, where the right command will originate to convert the device from a functioning extension phone unit into a regular beeper via the SCEL 138 to the ILC 137 to the output bus 150 to the speaker 151 and then, alarming the user with a certain distinguishable beeping sound different from the alarm signals peculiar to both the incoming calls and the audio signals of any commencing pre-programmed phone calls to be made; at the same time an LCD display of possibly the telephone number and names of the calling party may be displayed continuously. Depending upon the ROM programming of the micro-computer and memory 139 another tone of audio signal to inform the user at the exact point of crossing over from the effective range of the extension telephone unit to the ineffective range of the same unit can be initiated to effect an immediate conversion of the unit into a regular beeper. In this particular case, when the incoming call signal is still strong enough to be transmitted from the central base unit to the antenna to the RF amplifiers 133 to the modulator and detector duplexer 134 to either the audio amplifiers 135 or digital amplifiers 136 to the ILC 137 and the SCEL 138 to the micro-computer 139, the device will still function as an extension telephone. But as soon as the signals reaching the micro-computer becomes substantially weak, the pre-programmed ROM of the micro-computer will send an audio alarm signal to Speaker Block 141, via the SCEL 138, the ILC 137, and the output bus 150, and at the same time, the micro-computer will be ready to receive the beeper's radio frequency wavelengths of the incoming call as it is now instantly converted into a regular beeper.

Each time the pre-programmed targeted party and phone number has been contacted, pressing or activating the Asterisk "*" key will send the information from block 114 via the input bus 131 to the ILC 137 to the SCEL 138, and then impress this marking together with the relevant block of information currently on display at the LCD display block 144, so that upon future forward or backward retrieval of the data in sequential order, the user will be able to identify which parties and telephone numbers have already been contacted from those which nave not yet been contacted by simply watching the LCD display window whether or not the asterisk marking appears with each set of relevant block of information.

During instances wherein the user does not want to hear the alarm signals of some futurely commencing pre-programmed calls to be made, the user than activates the "NA" key, and the information is sent via the input bus 131 to the ILC 137 to the SCEL 138 to the micro-computer and memory 139 where there will be set an automatic inhibition of the audio alarm signals until such time as the "NA" or No Alarm key has been de-activated again in order that audio alarm signals can be heard at speaker block 151.

In order to perform mathematical calculations, the user must activate the "CAL" (Calculator) key, first and then the information is sent via the input bus 131 to the ILC 137 to the SCEL 138 to the micro-computer and memory 139, where the proper input coming from the right combination of numerals from block 121, and the right mathematical functional input coming from block 120 are processed to effect the instantaneous display of the right mathematical answer, at block 144, via the SCEL 138, the ILC 137, and the output bus 150. In case the mathematical functions as well as the micro-computer and memory are all coordinated with a synthesized speech capability enabling the device to give the power answer in the form of an audible voice output through speaker 151, the micro-computer will then send the right answer in properly generated synthesized voice output through the SCEL 138, the ILC 137, and the output bus 150 to the speaker 151.

In case the user would like to listen to the AM or FM radio broadcast independent of the telepone function, it is not necessary to activate the "RAD" mode key, and the user utilizing the proper controls, tuning, volume, and selector, can just listen to the selected radio broadcast through the speaker 151 via input bus 152 to the ILC 137 to the SCEL 138 to the micro-computer 139, then back to the SCEL 138 to the ILC 137 to the output bus 150. However, when the "RAD" key is activated, the radio functions will automatically become integrated with the phone functions, such as have already been described, because the signal information from block 116 is sent via the input bus 131 to the ILC 137 to the SCEL 138 to the micro-computer 139, which will coordinate the output of the radio according to the desired phone function pre-programming and electronic alarm or reminding procedure.

In case the micro-cassette tape recorder will be used independent of the phone function, it is not necessary to activate the "Micro-TR" key and no information will be coming from block 129. Therefore, the tape cassette will just function independent of the phone operations so that the user can record or playback, rewind, or fast forward the micro-cassette sub-system as in block 148 to give the necessary output to the speaker 151 via the input bus 152 to the ILC 137 to the SCEL 138 to the micro-computer and memory 139, back to the SCEL 138 to the ILC 137 and via output bus 150 for tape playback. For recording purposes however, there will be some audio information sent from block 101 via the necessary channels and controls and signal conditioning to the micro-computer from where the necessary command originates to be sent to the SCEL 138, the ILC 137, and to the output bus 150, to be impressed as a recorded message to the cassette tape in block 145.

In case the user would like to record a conversation between parties involving his extension telephone unit and the targeted phone, he simply activates the "RC" key, and information is sent from block 102 via the input bus 131 to the ILC 137, the SCEL 138 to the micro-computer and memory 139 where a command triggering the automatic re-tape recording of the inter-phone conversation can be brought about by signals coming from the micro-computer to the SCEL 138 to the ILC 137 to the output bus 150 to be recorded at the micro-cassette tape block 145. Concurrently, the "Micro T-R" key should also be in the activated position to allow command information from block 129 via the input bus 131 to the ILC 137 to the SCEL 138 to the micro-computer 139 to command the input from block 101, in coordination with block 148, to impress the recording of the telephone conversation at block 145 via the proper channels, controls, and signal conditioning. In order for the device not to infringe upon the privacy of conversations between the conversing parties, an automatic tape alert in block 141 may be integrated with the micro-computer to send a pre-programmed synthesized voice or speech message as processed by the micro-computer 139 and sent via the SCEL 138 to the ILC 137 to either the audio amplifiers 135 or digital amplifiers 136 to the modulator detector duplexer 134 to the RF amplifiers 133 to the antenna 132 to be sent to the central base unit toward the targeted party for audible receptivity through the phone receiver of the targeted phone.

The battery check in block 130 sends information via the proper channels, controls and signal conditioning to the micro-computer, to send the necessary information to the battery LED block 147, via the SCEL 138 and the ILC 137 through the output bus 150.

For incoming calls that are to be held in the waiting position, due to a secondary incoming call or tertiary incoming call, block 124 is activated to send the proper information through the input bus 131 to the ILC 137 to the SCEL 138 to the micro-computer and memory 139 which commands the respective hold calls blinkers block 146 to activate, via signals from the micro-computer to the SCEL 138 to the ILC 137 through the output bus 150.

In case an accessory television system is connected to block 126, the "TV" key must be activated, and the proper information from block 115 is sent through input bus 131 to the ILC 137 to the SCEL 138 to the micro-computer 139 where the proper television inter-linkage can be processed, and sent from the micro-computer to the SCEL 138 to the ILC 137 through the output bus 150 to the TV accessory unit 155, so that the television signal information passing through the proper cannels, controls, and conditioning from the central base unit, is received by the antenna 132 to block 133, block 134, to either block 135 or 136 to the ILC 137 to the SCEL 138 and then to the micro-computer 139, where processing occurs and signals sent to the SCEL 138 to ILC 137 through the output bus 150 and then to the accessory TV system so that the parties concerned may be able to visually perceive the desired transmitted TV images.

It is to be noted that the extension telephone unit is battery operated and can be recharged by a recharger unit connected to both the device and an AC source, as in block 142. Although this invention as a whole is described as an extension telephone unit, the various features in combination with the proper systems and subsystems can be utilized also as a mobile telephone or as a regular plugged-in telephone system.

The invention, as described, is susceptible to modification without departing from the inventive concept and right is herein reserved to such modifications as may fall within the scope and equivalence of the appended claims.

What is claimed is:

1. A programmable telephone apparatus for use in placing and receiving telephone calls between user and a party having a remotely located telephone unit, comprising:

a computer means having a memory for storing data and commands which define operations on said data and having logic means for processing said data;

a telephone station adapted to receive incoming calls and originate outgoing calls;

logic circuit means for electrically interfacing said computer means and said telephone station;

a clock and calendar means coupled to said computer means for generating information corresponding to time and date and for inputting said information into said computer means;

a keyboard input for said computer means, said keyboard input having a plurality of keys and adapted to program said memory with data corresponding to one or more telephone numbers to be called and the time and date such telephone calls are to be placed;

an alarm means coupled to said computer means and responsive to said clock and calendar means for generating an alarm signal for each of said telephone numbers upon the reaching of the time and date data corresponding to a respective one of said telephone numbers; and output means responsive to said alarm signal for displaying a respective telephone number corresponding to the actual time and date and for audibly outputting an alarm when the actual time and date occurs for said respective telephone number to indicate that the respective telephone call is ready to be placed.

2. A programmable telephone apparatus according to claim 1 including a tape recorder operative to selectively record telephone conversations of parties using said telephone station.

3. A programmable telephone apparatus according to claim 2 including synthesized speech generation means for informing the parties involved in a telephone conversation that said tape recorder is in a record mode.

4. A programmable telephone apparatus according to claim 2 wherein the tape recorder can be used for recording and play-back independently of telephone calls.

5. A programmable telephone apparatus according to claim 1 including a television receiverr means for receiving and transmitting signals between parties.

6. A programmable telephone apparatus according to claim 1 including automatic redial means for automatically redialing a telephone number corresponding to a remotely located unit until said telephone call is completed to said remotely located unit.

7. A programmable telephone apparatus according to claim 1 including call hold means for receiving and holding a plurality of telephone calls.

8. A programmable telephone apparatus according to claim 1 including automatic dial means adapted to respond to said alarm signal for automatically dialing said telephone numbers.

9. A programmable telephone apparatus according to claim 8 including dial disable means for selectively inhibiting said automatic dial means.

10. A programmable telephone apparatus according to claim 1 where said telephone station includes a base station and a cordless hand-held receiver, each of said base station and said hand-held receiver having transmission and reception means for broadcasting and receiving radiant signals for providing simultaneous two-way communication therebetween within a defined geographical range wherein said radiated signals have a strength above a detection level.

11. A programmable telephone apparatus according to claim 10 including signal sensing means for measuring the strength of the radiant signal received by said receiver from said base station and for generating a conversion output at a pre-selectd threshhold strength, and a conversion means responsive to said conversion output for converting said hand-held receiver into a tone generator whereby said hand-held receiver produces a tone signal when the received radiant signals have a strength less than said threshhold strength but above said detection level and whereby said hand-held receiver is operative to transmit and receive said telephone calls when the received radiant signals have a strength equal to or greater than said threshhold strength.

12. A programmable telephone apparatus according to claim 10 including a radio receiver means in said hand-held unit for receiving commercial radio broadcasts, said transmission means associated with said hand-held receiver adapted to selectably transmit said broadcasts through said base station to said remotely located telephone unit.

* * * * *